(12) United States Patent
Tseng

(10) Patent No.: US 6,767,119 B2
(45) Date of Patent: Jul. 27, 2004

(54) DIRECTION ADJUSTABLE DEVICE FOR AN AUTOMOBILE WITH A STEERING LINKAGE

(76) Inventor: Chian-Yin Tseng, No. 60, Lane 105, Wen-Nan Road, Tainan City (TW)

( * ) Notice: Subject to any disclaimer, the term of this patent is extended or adjusted under 35 U.S.C. 154(b) by 0 days.

(21) Appl. No.: 10/387,181

(22) Filed: Mar. 11, 2003

(65) Prior Publication Data

US 2003/0173139 A1 Sep. 18, 2003

(30) Foreign Application Priority Data

Mar. 14, 2002 (GB) .............................................. 0206045
Jul. 30, 2002 (GB) .............................................. 0217646

(51) Int. Cl.$^7$ ............................ F21V 21/29; B60Q 1/12
(52) U.S. Cl. .......................... 362/465; 362/37; 362/40
(58) Field of Search ............................ 362/465, 37, 40, 362/44, 49, 51

(56) References Cited

U.S. PATENT DOCUMENTS 3,947,680 A * 3/1976 Cadiou ......................... 362/38
4,533,860 A * 8/1985 Saito ........................... 318/673

\* cited by examiner

*Primary Examiner*—Alan Cariaso
*Assistant Examiner*—Guiyong Lee
(74) *Attorney, Agent, or Firm*—Marger Johnson & McCollom, PC

(57) ABSTRACT

A direction adjustable device includes a motor drive unit for driving a turnable unit to turn, and a sensor assembly which includes a force transmitting member, a cable having first and second ends connected to the force transmitting member and a steering linkage, respectively, a rotary control switch coupled to the force transmitting member such that pivoting movement of the latter is transmitted to a signal processing unit, and a reversing member adapted to be connected to the steering linkage.

16 Claims, 18 Drawing Sheets

US 6,767,119 B2

DIRECTION ADJUSTABLE DEVICE FOR AN AUTOMOBILE WITH A STEERING LINKAGE

CROSS-REFERENCE TO RELATED APPLICATION

This application claims priority of British Application Nos. 0206045.7 filed on Mar. 14, 2002 and 0217646.9 filed on Jul. 30, 2002.

BACKGROUND OF THE INVENTION

1. Field of the Invention

The invention relates to a direction adjustable device, more particularly to a direction adjustable device for an automobile with a steering linkage.

2. Description of the Related Art

GB 2346435A discloses a rotatable automobile front lamp apparatus that is capable of rotating in accordance with the steering of a set of front wheels of an automobile so as to reduce the possibility of an accident and enhance safety especially when driving along a winding road.

However, since most cars have different accessories installed in different positions below the engine hood, the space for installing other equipment between the steering wheel and the two front wheels is very limited.

SUMMARY OF THE INVENTION

Therefore, the main object of the present invention is to provide a direction adjustable device for an automobile with a steering linkage that can be easily installed in an automobile without occupying too much space.

Accordingly, a direction adjustable device of this invention is adapted to be installed in an automobile. The automobile has an automobile body, a set of automobile wheels mounted on the automobile body, a steering wheel, and a steering linkage interconnecting the steering wheel and the automobile wheels. The direction adjustable device comprises a turnable unit, a motor drive unit, and a sensor assembly. The motor drive unit is adapted to be mounted to the automobile body, and is coupled to the turnable unit for driving the turnable unit to turn. The sensor assembly includes a housing, a force transmitting member, a first cable, a rotary control switch, a signal processing unit, and a reversing member. The housing is adapted to be mounted to the automobile body adjacent to the steering linkage. The force transmitting member is mounted pivotally to the housing. The first cable has a first end connected to the force transmitting member, and a second end adapted to be connected to the steering linkage such that movement of the steering linkage in a first lateral direction results in pivoting movement of the force transmitting member from an initial position in a first rotational direction. The rotary control switch is mounted to the housing, and is coupled to the force transmitting member such that pivoting movement of the force transmitting member is transmitted to the rotary control switch to enable the rotary control switch to generate a corresponding electrical output. The signal processing unit is connected electrically to the motor drive unit and the rotary control switch, receives the electrical output of the rotary control switch, determines direction and extent of pivoting movement of the force transmitting member from the electrical output, and controls the motor drive unit to drive the turnable unit to turn by an angle corresponding to the direction and extent of pivoting movement of the force transmitting member. The reversing member is coupled to the force transmitting member, and is adapted to be connected to the steering linkage such that movement of the steering linkage in a second lateral direction, which is opposite to the first lateral direction, results in pivoting movement of the force transmitting member from the initial position in a second rotational direction, which is opposite to the first rotational direction.

BRIEF DESCRIPTION OF THE DRAWINGS

Other features and advantages of the present invention will be come apparent in the following detailed description of the preferred embodiments with reference to the accompanying drawings, of which.

DETAILED DESCRIPTION OF THE PREFERRED EMBODIMENTS

Figure 1:
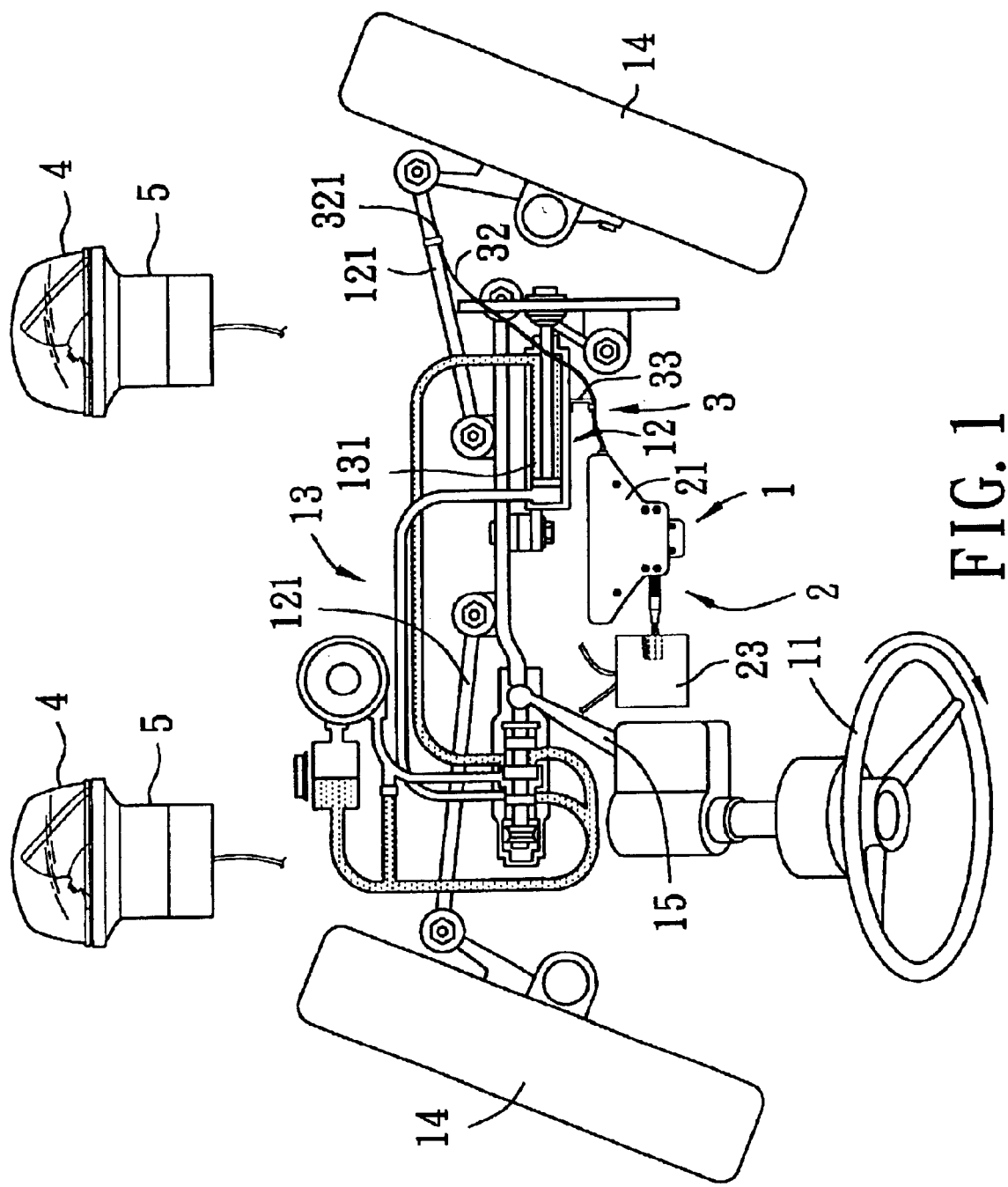
FIG. 1 is a schematic fragmentary top view illustrating an automobile that incorporates the first preferred embodiment of a direction adjustable device according to the present invention.
Figure 2:
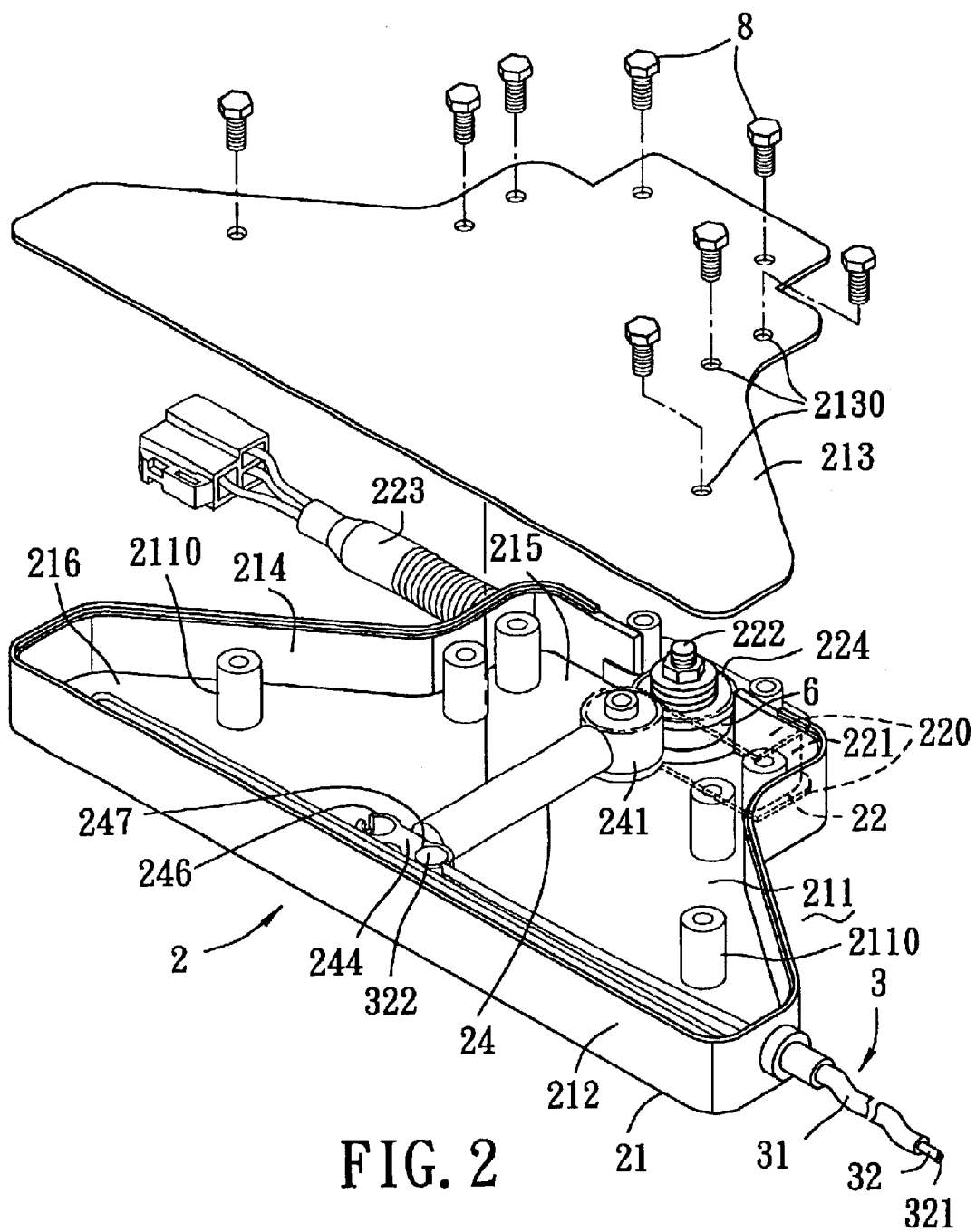
FIG. 2 is a partly exploded inverted perspective view showing a sensor assembly of the first preferred embodiment.

Before the present invention is described in greater detail, it should be noted that like elements are denoted by the same reference numerals throughout the disclosure.

Referring to FIGS. 1 to 7, the first preferred embodiment of a direction adjustable device 1 according to the present invention is shown to be adapted to be installed in an automobile (not shown). The automobile has an automobile body (not shown), two automobile wheels 14, a steering wheel 11, and a steering linkage 12 interconnecting the steering wheel 11 and the automobile wheels 14. The steering linkage 12 includes a swing arm 15 connected to the steering wheel 11, and left and right tie-rods 121 connected to the automobile wheels 14, and a steering assist unit 13 connected to the swing arm 15 and the tie-rods 121 and provided with a hydraulic cylinder 131. When the steering wheel 11 is rotated, the swing arm 15 moves at the same time such that through the control of the hydraulic cylinder 131 of the steering assist unit 13, the tie-rods 121 move to turn the wheels 14 accordingly. In this embodiment, the direction adjustable device 1 is installed in a position proximate to the tie-rods 121 and the hydraulic cylinder 131, and comprises two turnable units 4, two motor drive units 5, and a sensor assembly 2.

The sensor assembly 2 includes a housing 21, a force transmitting member 24, a first cable 3, a rotary control switch 22, a signal processing unit 23, and a reversing member 6. The housing 21 is adapted to be mounted to the automobile body (not shown) adjacent to the steering linkage 12, and includes a flat top plate 211, a surrounding plate 212 extending downwardly from a periphery of the top plate 211, and a cover plate 213 disposed on bottom of the surrounding plate 212 and parallel to the top plate 211. The top, surrounding and cover plates 211, 212, 213 cooperatively define a receiving chamber 214. The top plate 211 has a plurality of upright screw posts 2110, and includes a rear part 215 and a front part 216 opposite to and wider than that of the rear part 215. The surrounding plate 212 is formed with a notch 217 at the rear part 215 of the top plate 211. The front part 216 of the top plate 211 is formed with a longitudinal guide slot 218. The cover plate 213 is formed with a plurality of through holes 2130, and is fastened to the top plate 211 by a plurality of screws 8 that pass through the through holes 2130 in the cover plate 213 and that engage the upright screw posts 2110 on the top plate 211.

The force transmitting member 24 is disposed in the receiving chamber 214, and is mounted pivotally on the top plate 211 of the housing 21. The force transmitting member 24 includes a telescopic rod 242 with opposite first and second ends 2421, 2422, a driving gear 241 fixed to the first end 2421 of the rod 242 and mounted rotatably in the receiving chamber 214, and a cable seat 244 mounted on the second end 2422 (see FIG. 6) of the rod 242. The cable seat 244 is formed with a guide stud 245 and two pivot holes 246, 247 disposed on opposite sides of the guide stud 245. The guide stud 245 projects into the guide slot 218 in the front part 216 of the top plate 211 so as to guide pivoting movement of the force transmitting member 24 in the housing 21.

The first cable 3 includes a tubular sleeve 31, a wire member 32 freely movable along the length of the tubular sleeve 31, and a cable frame 33 mounted on the hydraulic cylinder 131. The sleeve 31 has two ends secured on the housing 21 and the cable frame 33, respectively. The wire member 32 has a first end 322 that extends into the housing 21 and that is fastened into one of the pivot holes 246, 247 in the cable seat 244 of the force transmitting member 24, and a second end 321 opposite to the first end 322. The second end 321 is adapted to be connected to one of the tie-rods 121 such that movement of the steering linkage 12 in a first lateral direction results in pivoting movement of the force transmitting member 24 from an initial position in a first rotational direction (R1) (see FIG. 3).

The rotary control switch 22 is mounted on a rear extension of the rear part 215 of the top plate 211, and includes a rotary sensor 221 clamped between two clamp plates 220, a sensor rod 222, a signal wire 223, and a driven gear 224 mounted on the sensor rod 222. The sensor rod 222 extends through the rear part 215 of the top plate 211, is disposed adjacent to the notch 217 in the surrounding plate 212, and is operably associated with the rotary sensor 221. The driven gear 224 meshes with the driving gear 241 of the force transmitting member 24 such that pivoting movement of the force transmitting member 24 is transmitted to the rotary control switch 22 so as to enable the latter to generate a corresponding electrical output in a known manner.

The signal processing unit 23 is connected electrically to the motor drive units 5 and to the rotary control switch 22 via the signal wire 223, receives the electrical output of the rotary control switch 22, determines direction and extent of pivoting movement of the force transmitting member 24 from the electrical output, and controls each motor drive unit 5 to drive the corresponding turnable unit 4 to turn by an angle corresponding to the direction and extent of pivoting movement of the force transmitting member 24.

Figure 3:
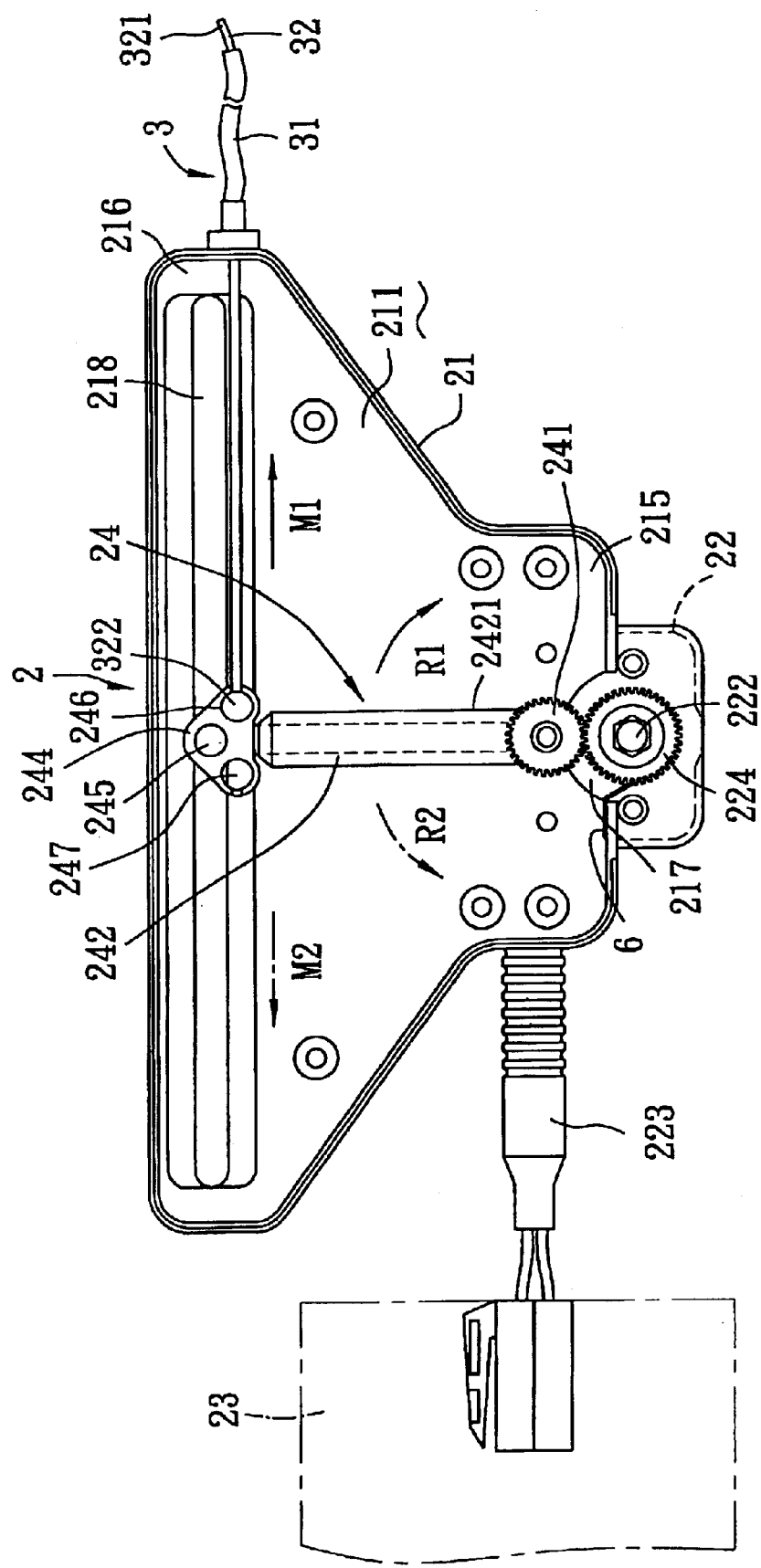
FIG. 3 is a schematic fragmentary top view of the sensor assembly of the first preferred embodiment with a force transmitting member in an initial position.

The reversing member 6, in this embodiment, is a torsional spring which is coupled to the housing 21 and the sensor rod 222 of the rotary control switch 22 so as to bias the force transmitting member 24 to turn in the second rotational direction (R2), as best illustrated in FIG. 3.

Figure 4:
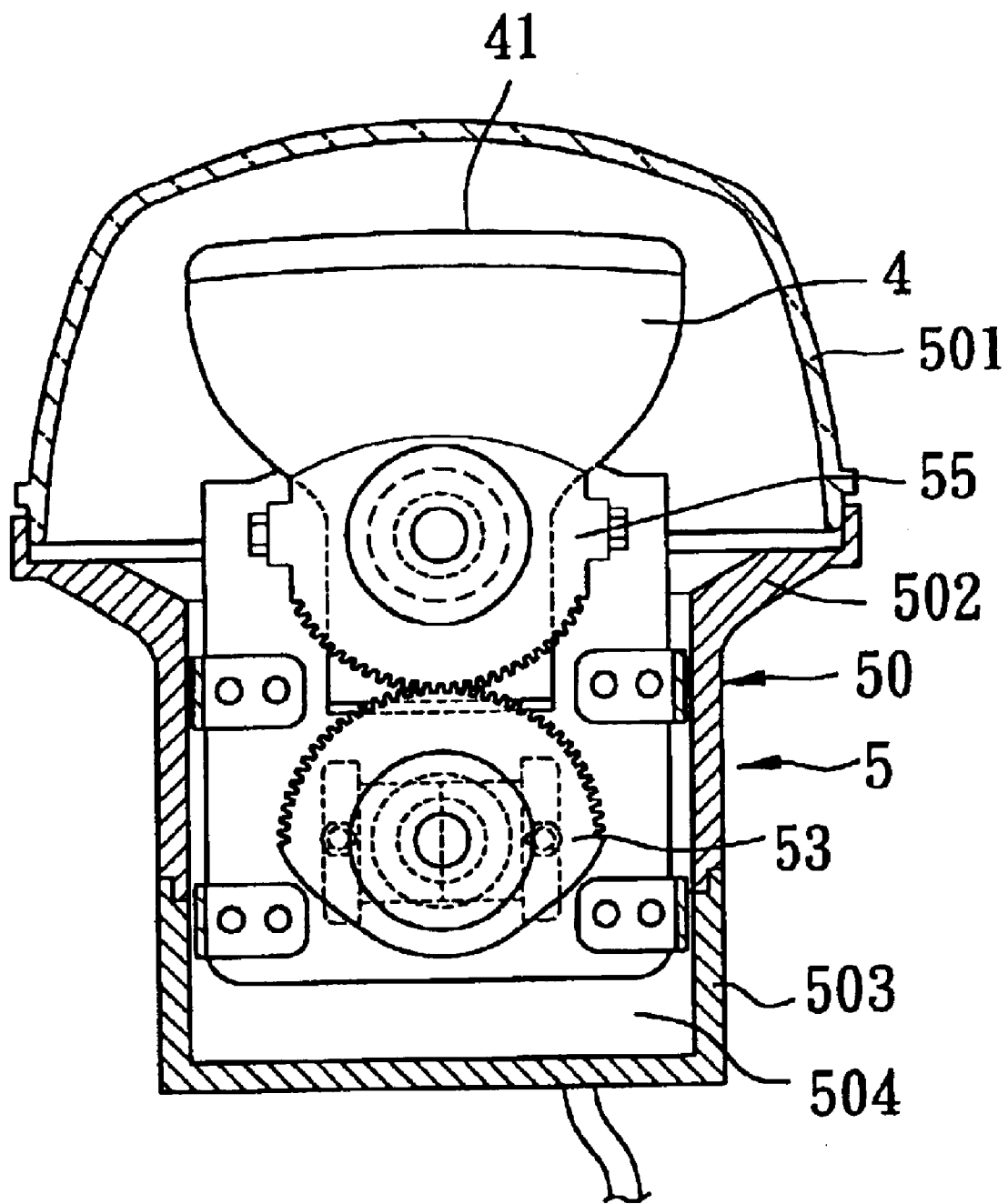
FIG. 4 is a schematic sectional view illustrating a turnable unit and a motor drive unit of the first preferred embodiment.
Figure 5:
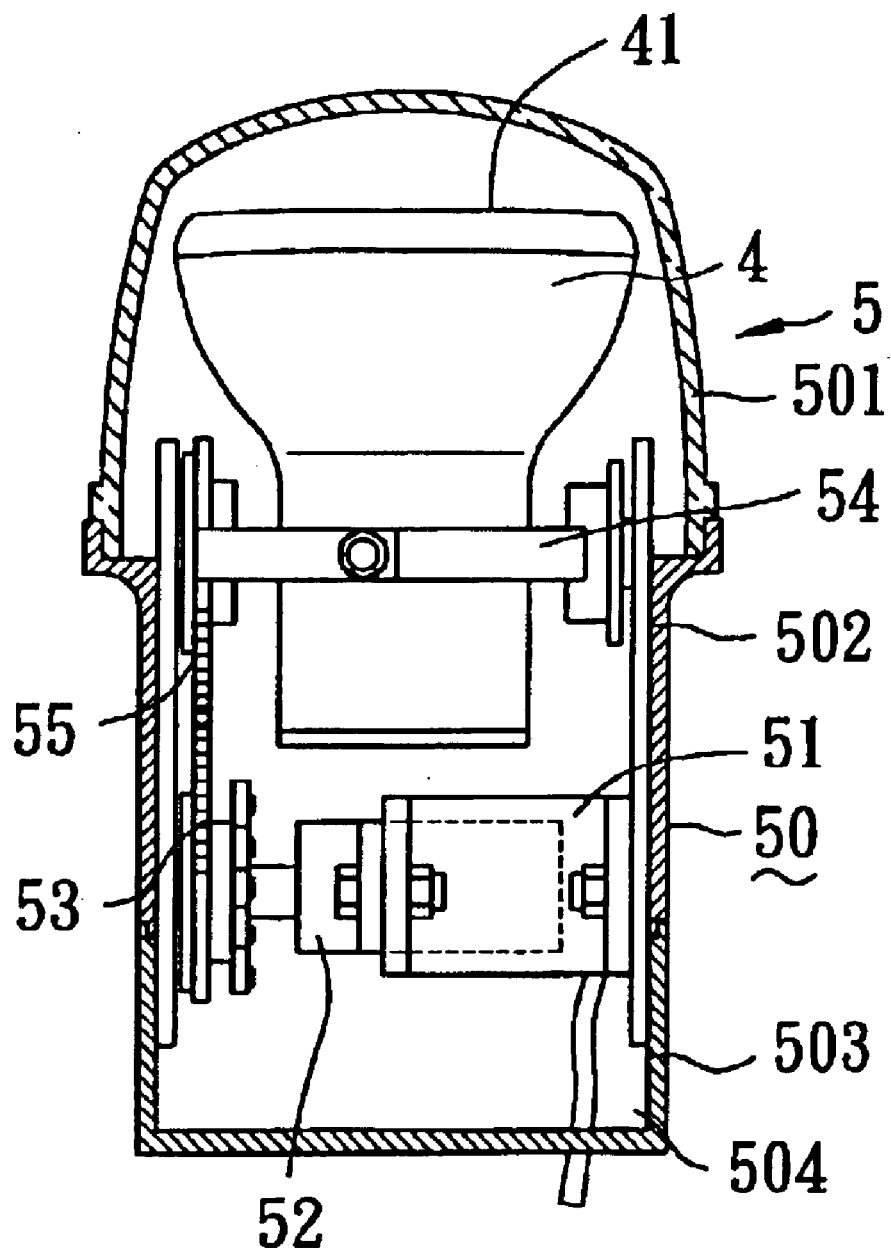
FIG. 5 is another schematic sectional view, illustrating the turnable unit and the motor drive unit of the first preferred embodiment when viewed from a different angle.
Figure 6:
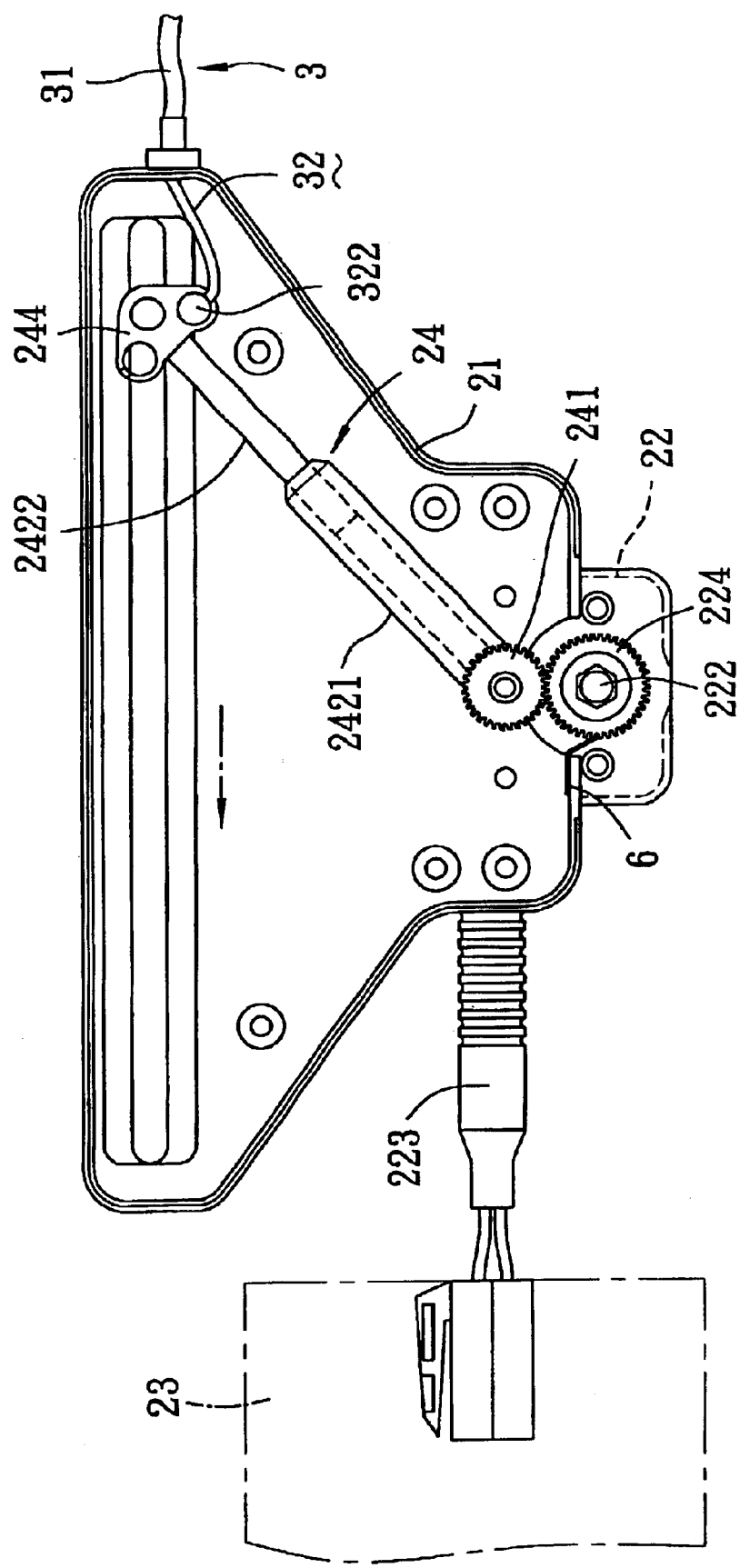
FIG. 6 is another schematic fragmentary top view of the sensor assembly of the first preferred embodiment, illustrating the force transmitting member when moved from the initial position.

The motor drive units 5, as best shown in FIGS. 1, 4 and 5, are adapted to be mounted separately on left and right front parts of the automobile body (not shown). Each of the motor drive units 5 includes an outer casing 50, a motor support frame 51 secured in the outer casing 50, a motor unit 52 mounted on the motor support frame 51 and connected electrically to the signal processing unit 23, and a first sector gear 53 coupled to the motor unit 52. In this embodiment, the outer casing 50 of each motor drive unit 5 is a lamp housing, and includes a front transparent lamp cover 501, a cover support 502 connected to the lamp cover 501, and a back cover 503 connected to the cover support 502. The lamp cover 501, the cover support 502, and the back cover 503 cooperate to confine a receiving space 504.

Each of the turnable units 4 in this embodiment is a lamp, and includes a rotatable base frame 54 mounted pivotally in the outer casing 50, a second sector gear 55 mounted on the base frame 54 and meshing with the first sector gear 53, a reflector 41, and a light bulb (not shown). When the reflector 41 and the light bulb are securely connected to each other, they will turn with the base frame 54. When the reflector 41 and the light bulb are separated from each other, only the reflector 41 will turn with the base frame 54. The light bulb will remain stationary in the outer casing 50.

Referring to FIGS. 3 and 4, when each turnable unit 4 is in an initial position, the guide stud 245 of the force transmitting member 24 is positioned at the middle portion of the longitudinal guide slot 218.

Figure 7:
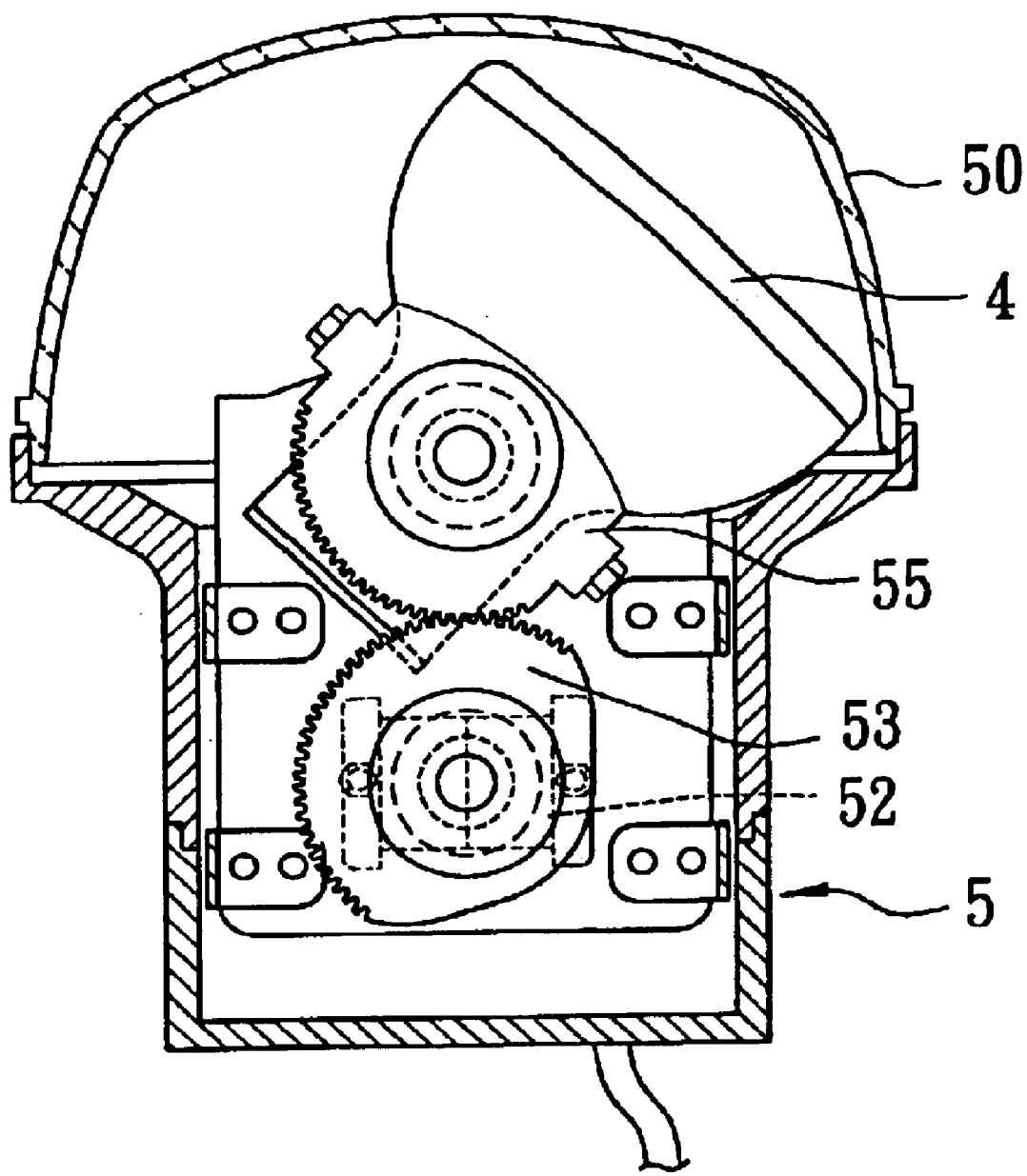
FIG. 7 is a view similar to FIG. 4, illustrating how the turnable unit of the first preferred embodiment is turned when driven by the motor drive unit.

When the driver steers the steering wheel 11 to rotate in a direction shown by an arrow in FIG. 1, the steering linkage 12 moves rightward for driving the two wheels 14 to turn accordingly. At the same time, the first cable 3 pulls the force transmitting member 24 to pivot in a rightward direction (M1) with the driving gear 241 serving as a fulcrum. As such, the sensor rod 222 of the rotary control switch 22 is driven by the driven gear 224 to rotate accordingly since the driven gear 224 meshes with the driving gear 241. The direction and extent of pivoting movement of the force transmitting member 24 are detected by the rotary sensor 221 and are transmitted to the signal processing unit 23 via the signal wire 223. The signal processing unit 23 responds by activating each motor unit 52 accordingly. As such, each turnable unit 4 can rotate synchronously with the steering wheel 11 due to the meshing of the first and second sector gears 53, 55, as best shown in FIG. 7.

When the steering wheel 11 is rotated in a direction opposite to the arrow shown in FIG. 1, since leftward movement of the steering linkage 12 will loosen the wire member 32, the reversing member 6 will bias the force transmitting member 24 to turn in the second rotational direction (R2). As such, the wire member 32 will be pulled by the force transmitting member 24 to move in a leftward direction (M2). When the force transmitting member 24 pivots in the second rotational direction (R2), the direction and extent of pivoting movement are similarly transmitted to the rotary control switch 22 via the driven gear 224 so that a corresponding electrical output can be generated. The electrical output is received by the signal processing unit 23, which activates the motor unit 52 of each motor drive unit 5 to rotate in a reverse direction, thereby turning the corresponding turnable unit 4 synchronously with the steering wheel 11.

Figure 8:
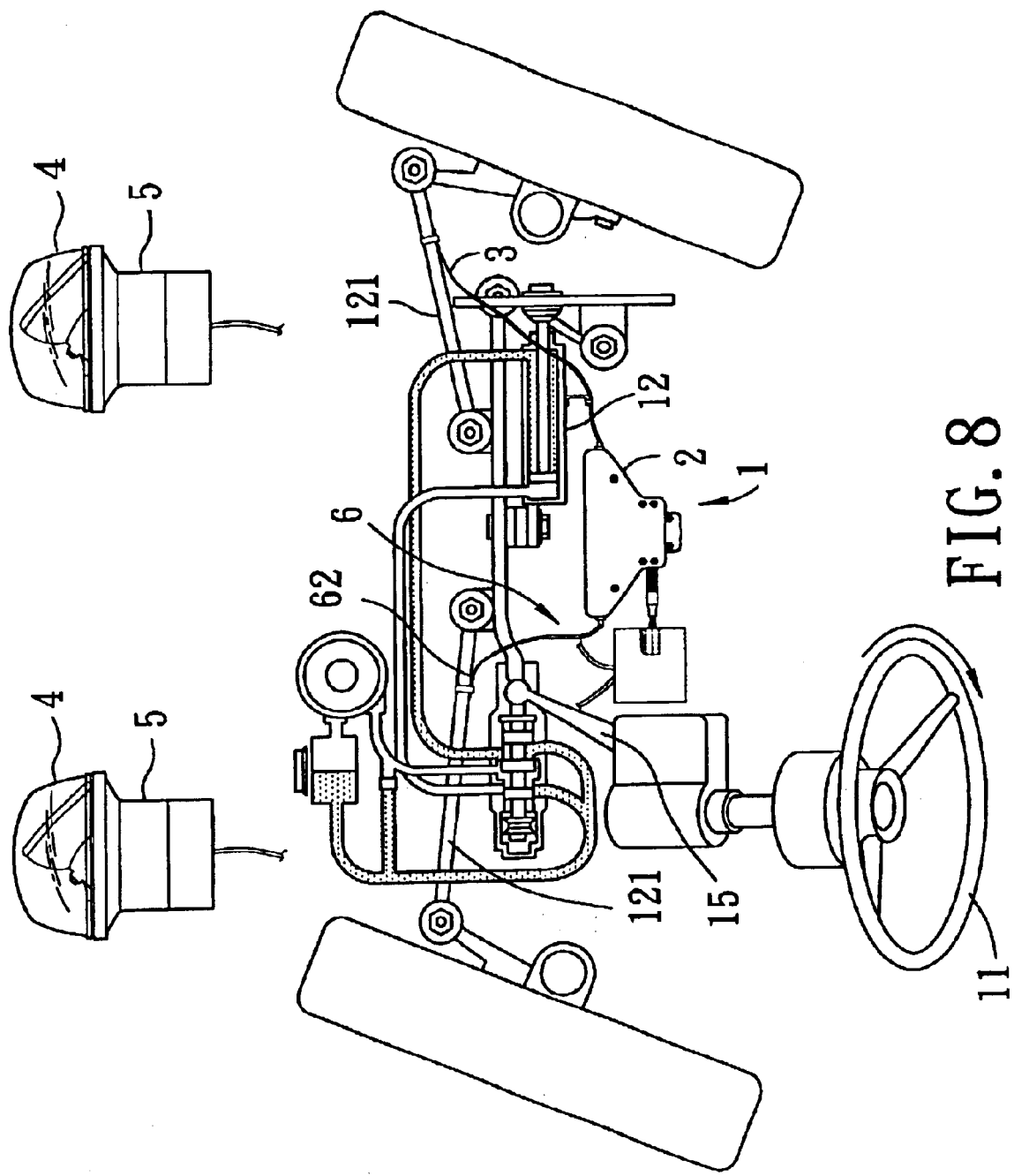
FIG. 8 is a schematic fragmentary top view illustrating an automobile that incorporates the second preferred embodiment of a direction adjustable device according to the present invention.
Figure 9:
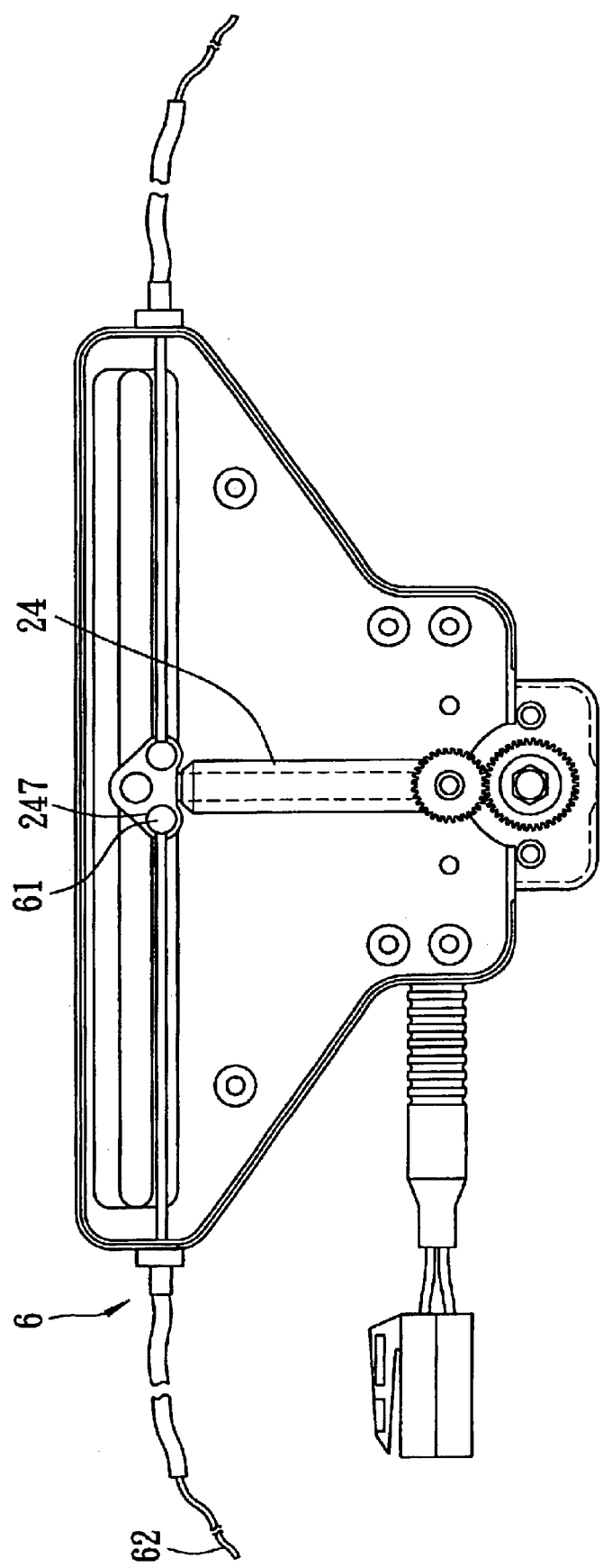
FIG. 9 is a schematic fragmentary top view of a sensor assembly of the second preferred embodiment.

Referring to FIGS. 8 and 9, the second preferred embodiment of a direction adjustable device 1 for an automobile having a steering linkage 12 is shown to be substantially similar in construction to the first preferred embodiment. Unlike the first preferred embodiment, the reversing member 6 includes a flexible second cable having a first end 61 fastened into the other one of the pivot holes 246, 247 of the force transmitting member 24, and a second end 62 adapted to be connected to the other one of the tie-rods 121 such that subsequent movement of the steering linkage 12 in a second lateral direction opposite to the first lateral direction results in corresponding pivoting movement of the force transmitting member 24.

It is noted that the design of each motor drive unit 5 should not be limited to the disclosed embodiment. What is important is that the motor drive unit 5 can rotate the turnable unit 4 synchronously with the steering wheel 11.

Figure 10:
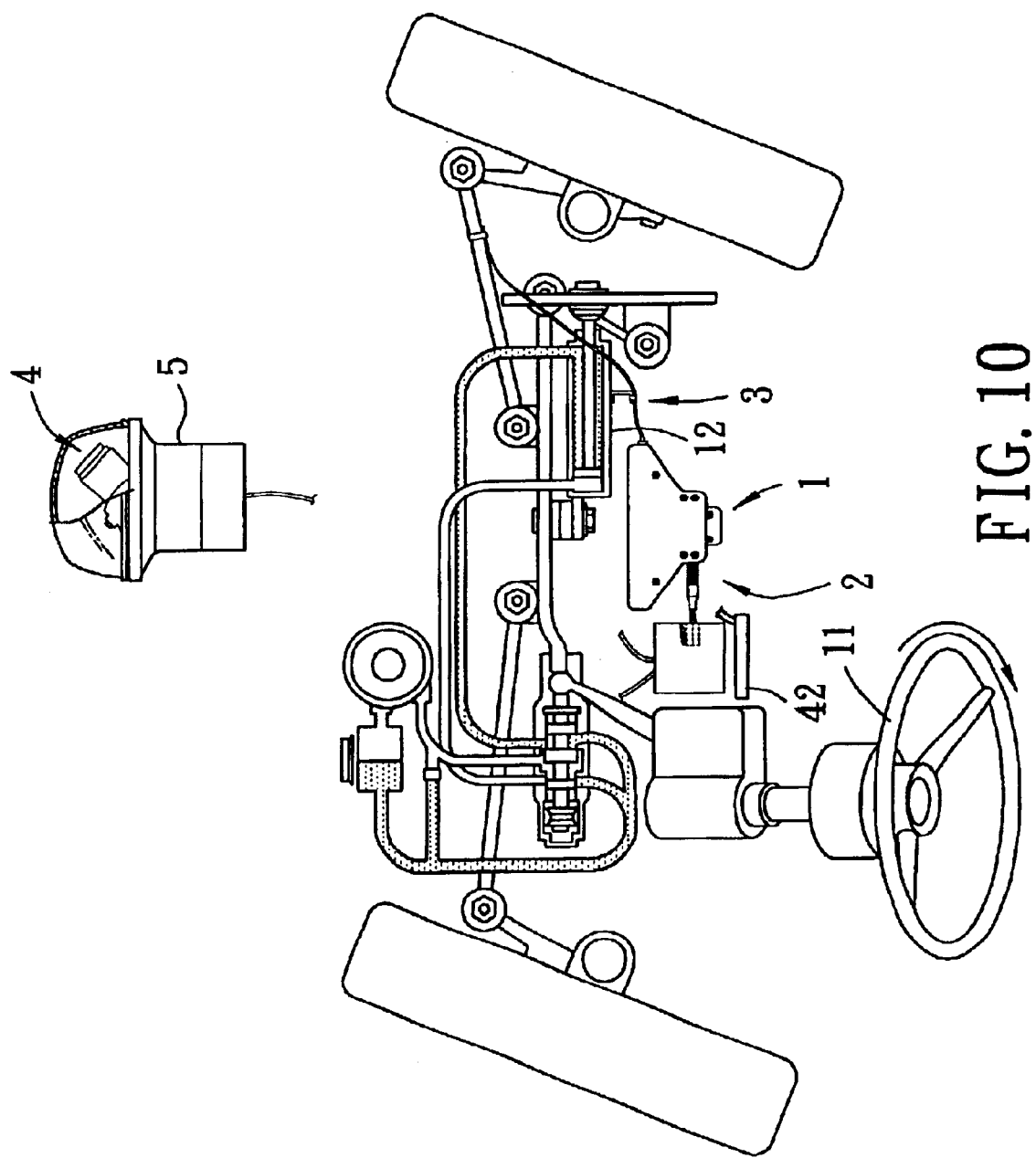
FIG. 10 is a schematic fragmentary top view illustrating an automobile that incorporates the third preferred embodiment of a direction adjustable device according to the present invention.

The third preferred embodiment of a direction adjustable device 1 for an automobile having a steering linkage 12 is shown in FIG. 10 to be substantially similar to the first preferred embodiment, the main difference residing in the construction of the turnable unit 4. In this embodiment, the turnable unit 4 is an infrared camera, and a monitor 42 is electrically connected to the camera 4 and is disposed adjacent to the steering wheel 11. The camera 4 rotates synchronously with the steering wheel 11, and the images captured by the camera 4 are transmitted to the monitor 42 to enable the driver to view the road conditions. The turnable unit 4 can also be in the form of another device with a sensor function.

Figure 11:
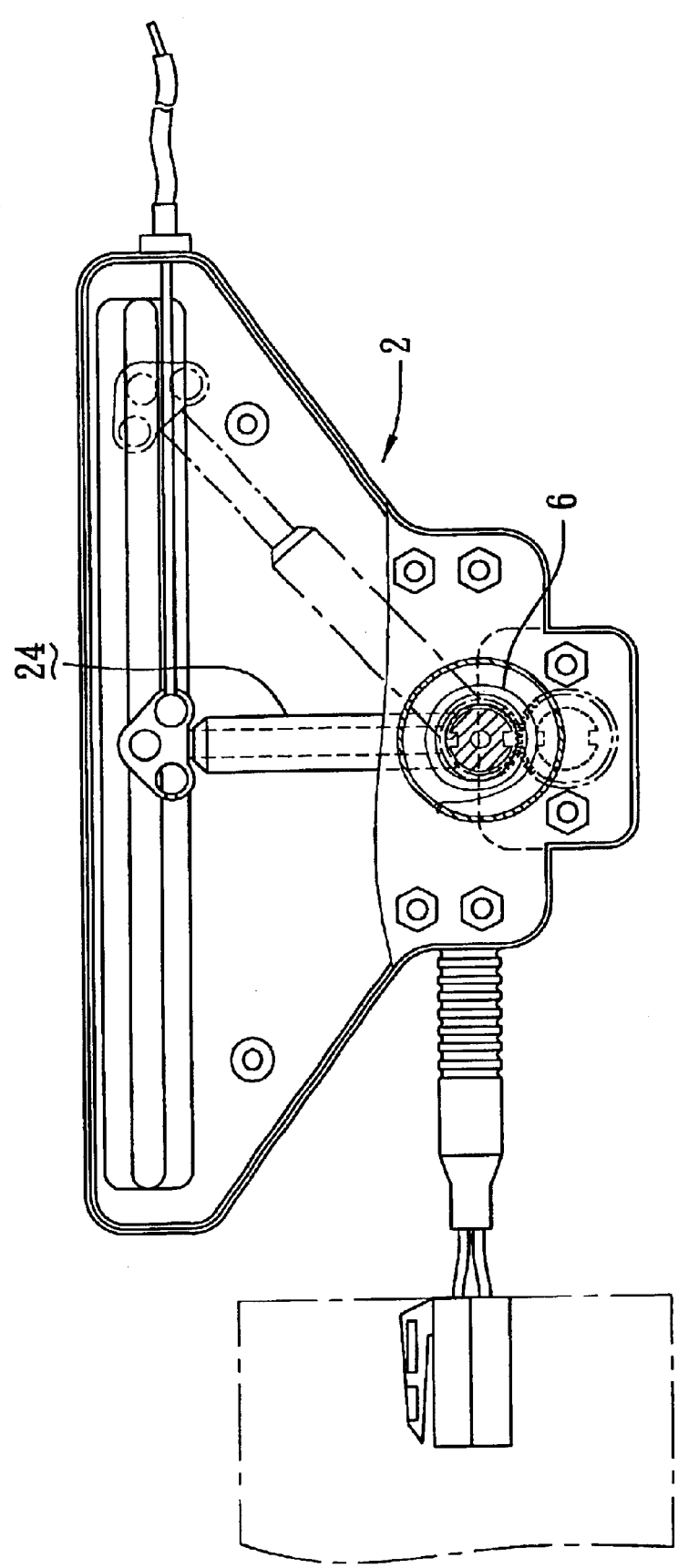
FIG. 11 is a schematic fragmentary top view of a sensor assembly of the fourth preferred embodiment of a direction adjustable device according to the present invention.
Figure 12:
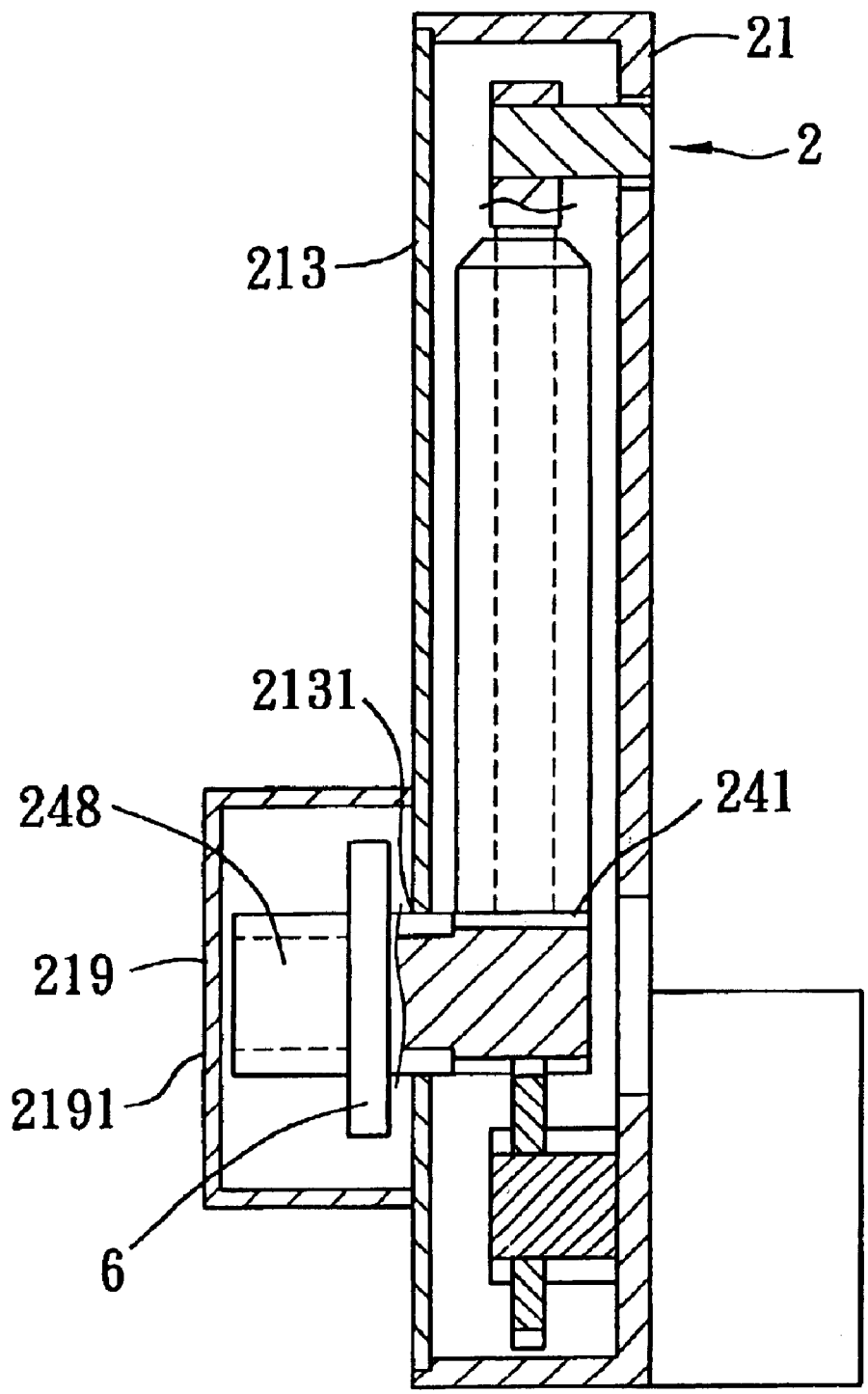
FIG. 12 is a schematic sectional view of the sensor assembly of the fourth preferred embodiment.

Referring to FIGS. 11 and 12, the fourth preferred embodiment of a direction adjustable device 1 for an automobile having a steering linkage is shown to be substantially similar to the first preferred embodiment. However, in this embodiment, the position of the reversing member 6 in the sensor assembly 2 is changed, and the cover plate 213 of the housing 21 is formed with a hole 2131. The reversing member 6 is coupled to the force transmitting member 24, and is adapted to be connected to the steering linkage such that movement of the steering linkage in a second lateral direction results in pivoting movement of the force transmitting member 24 from the initial position in a second rotational direction. The driving gear 241 of the force transmitting member 24 has a fixed bottom post portion 248 that extends through the hole 2131. The reversing member 6 includes a torsional spring that is sleeved on the bottom post portion 248 of the driving gear 241 and that is connected to the housing 21. The housing 21 further includes a hollow cylinder 219, which covers the bottom post portion 248 of the driving gear 241 and which has a closed bottom end 2191 and an open top end that is fixed on the cover plate 213.

Figure 13:
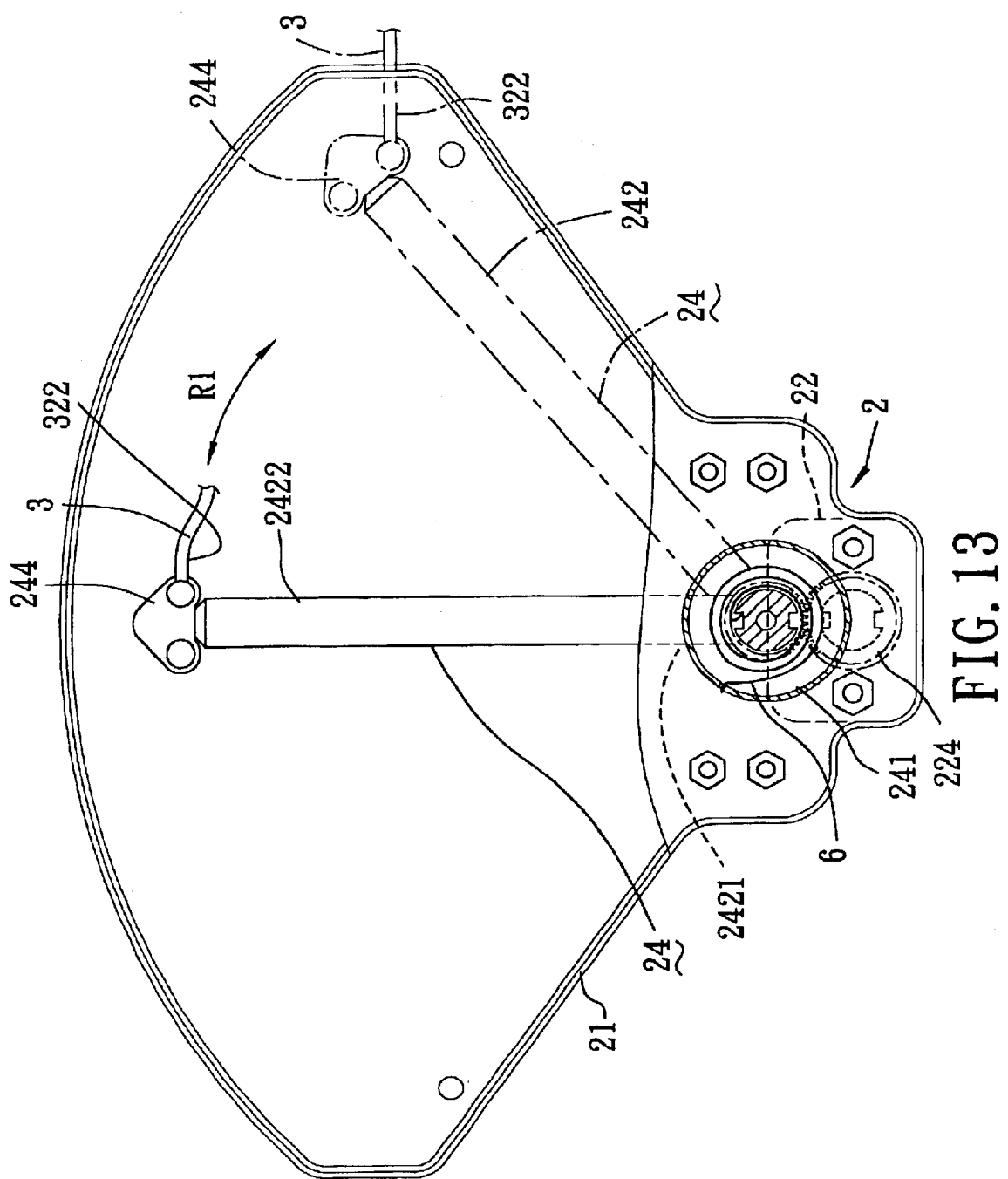
FIG. 13 is a schematic fragmentary top view of a sensor assembly of the fifth preferred embodiment of a direction adjustable device according to the present invention.

Referring to FIG. 13, the fifth preferred embodiment of a direction adjustable device 1 for an automobile having a steering linkage is shown to be substantially similar to the fourth preferred embodiment, the main difference residing in the configuration of the housing 21 of the sensor assembly 2 and the construction of the force transmitting member 24. In this embodiment, the housing 21 is shaped like a sector. The force transmitting member 24 includes a fixed-length rod 242 with first and second ends 2421, 2422. The driving gear 241 is mounted on the first end 2421, and meshes with the driven gear 224 of the rotary control switch 22, and a cable seat 244 mounted on the second end 2422 of the fixed-length rod 242 and connected to the first end 322 of the first cable 3. When the force transmitting member 24 is pulled by the first cable 3 to turn in a first rotational direction (R1), the cable seat 244 moves along a curved path, thereby attaining the same effect as the previous embodiments.

Figure 14:
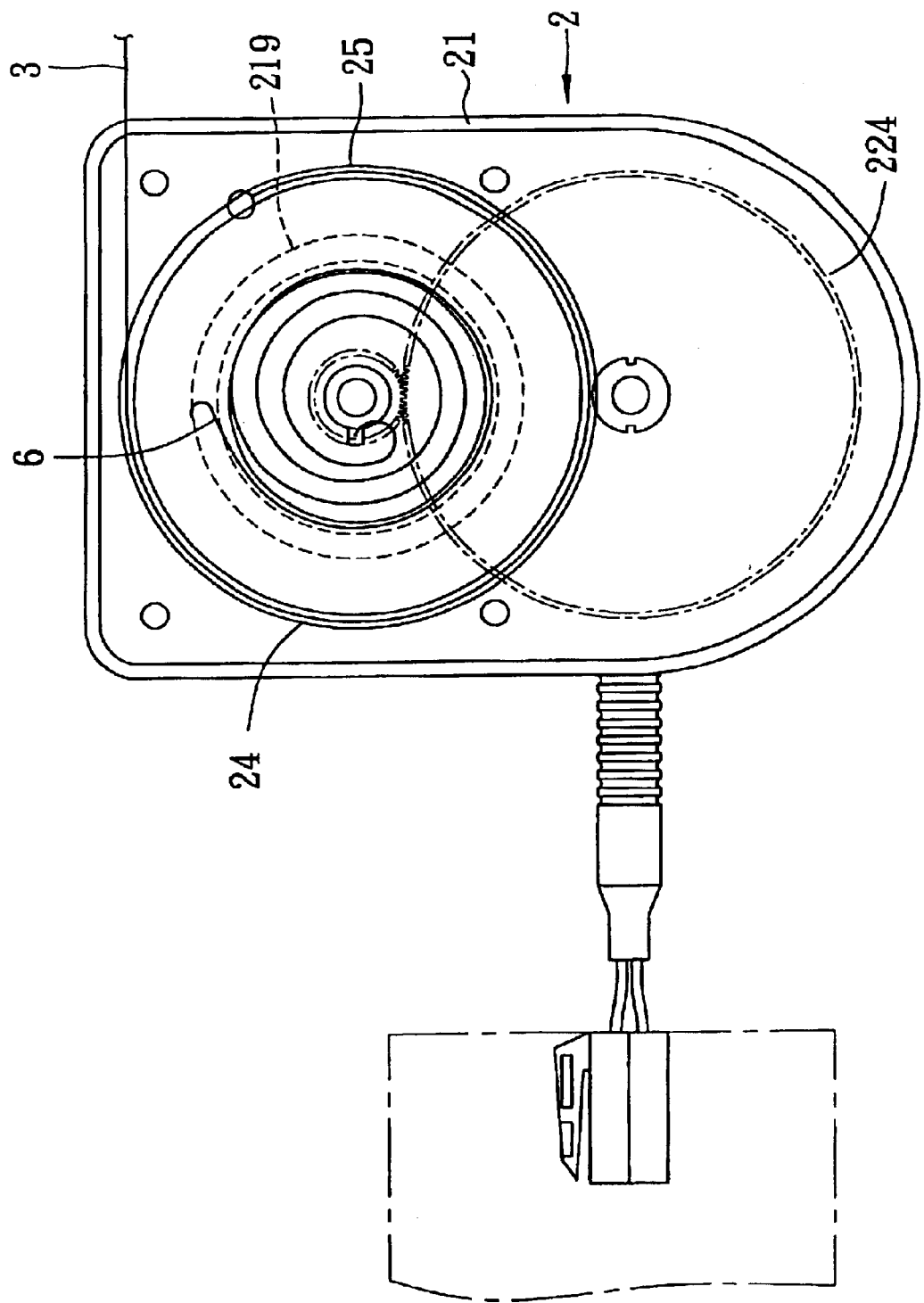
FIG. 14 is a schematic fragmentary top view of a sensor assembly of the sixth preferred embodiment of a direction adjustable device according to the present invention.
Figure 15:
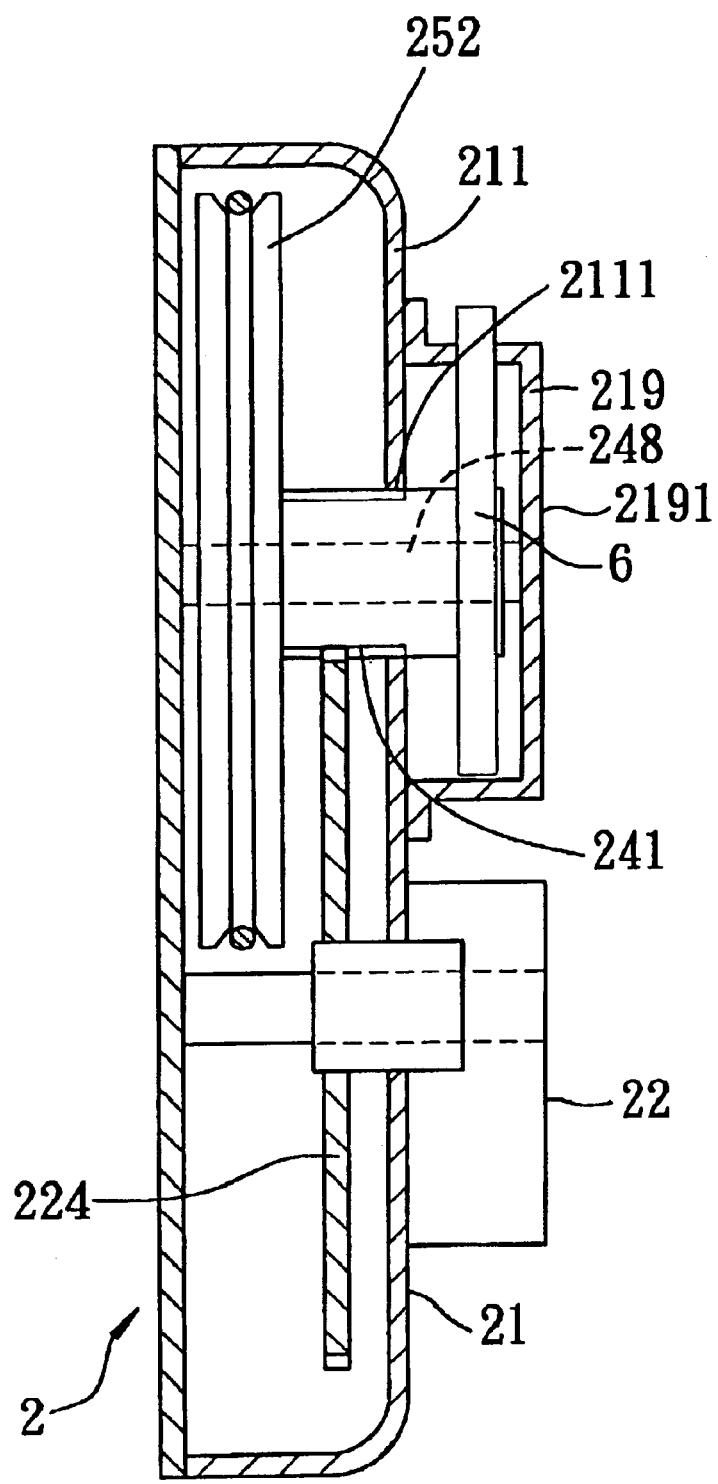
FIG. 15 is a schematic sectional view of the sensor assembly of the sixth preferred embodiment.

The sixth preferred embodiment of a direction adjustable device 1 for an automobile having a steering linkage is shown in FIGS. 14 and 15 to be substantially similar to the fourth preferred embodiment, the main difference residing in the configuration of the housing 21 of the sensor assembly 2 and the construction of the force transmitting member 24. In this embodiment, the force transmitting member 24 includes a driving gear 241, and a reel 25 connected coaxially and fixedly to the driving gear 241. The top plate 211 of the housing 21 is formed with a hole 2111. The driving gear 241 is mounted pivotally in the housing 21, meshes with the driven gear 224 of the rotary control switch 22, and includes a fixed top post portion 248 that extends through the hole 2111 in the top plate 211 of the housing 21. The first cable 3 is wound around the reel 25. The reversing member 6 includes a torsional spring that is sleeved on the top post portion 248 of the driving gear 241 and that is connected to the housing 21. The housing 21 further includes a hollow cylinder 219, which covers the top post portion 248 of the driving gear 241 and which has a closed top end 2191 and an open bottom end that is fixed on the top plate 211.

When the first cable 3 is pulled, the reel 25 and the top post portion 248 overcome the biasing force of the reversing member 6 and are turned simultaneously. At this time, the driving gear 241 meshes with the driven gear 224, thereby transmitting the direction and extent of pivoting movement to the rotary control switch 22 via the driven gear 224. As such, activation of the turnable units to turn synchronously with the steering wheel is attained.

Figure 16:
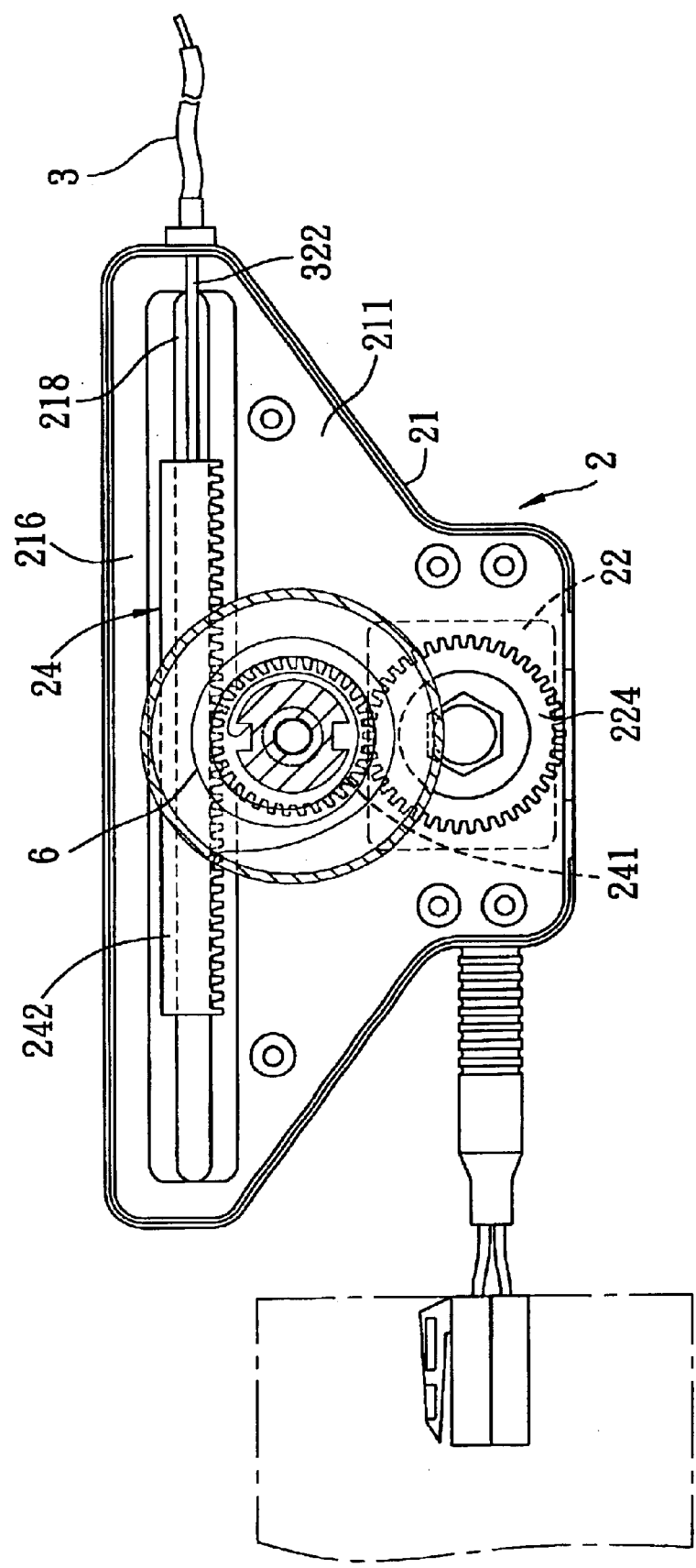
FIG. 16 is a schematic fragmentary top view of a sensor assembly of the seventh preferred embodiment of a direction adjustable device according to the present invention.

Referring to FIG. 16, the seventh preferred embodiment of a direction adjustable device 1 for an automobile having a steering linkage is shown to be substantially similar to the fourth preferred embodiment, the main difference residing in the construction of the sensor assembly 2. In this embodiment, the force transmitting member 24 includes a driving gear 241. The sensor assembly 2 includes a rack 242. The driving gear 241 is mounted pivotally in the housing 21, and meshes with the driven gear 224 of the rotary control switch 22. The rack 242 is disposed movably in the housing 21, and meshes with the driving gear 241. The first end 322 of the first cable 3 is fastened to an end of the rack 242. The front part 216 of the top plate 211 is formed with a longitudinal guide slot 218 to limit lateral movement of the rack 242. The reversing member 6 is coupled to the housing 21 and the force transmitting member 24, thereby biasing the force transmitting member 24 to turn in the second rotational direction. Similarly, the driving gear 241 meshes with the driven gear 224, thereby transmitting the direction and extent of pivoting movement to the rotary control switch 22 via the driven gear 224, and thereby activating the turnable units to turn synchronously with the steering wheel.

Figure 17:
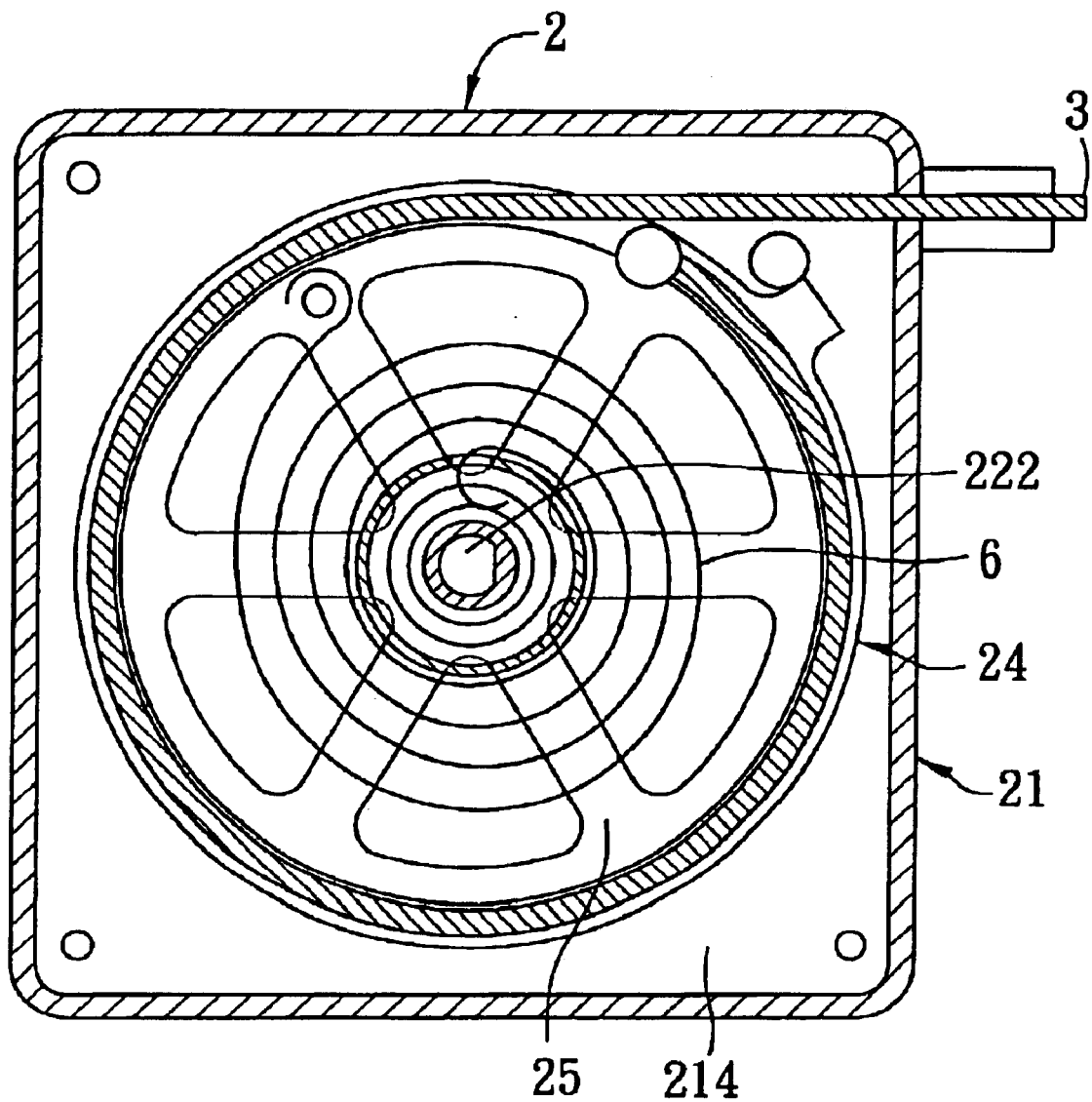
FIG. 17 is a schematic fragmentary top view of a sensor assembly of the eighth preferred embodiment of a direction adjustable device according to the present invention.
Figure 18:
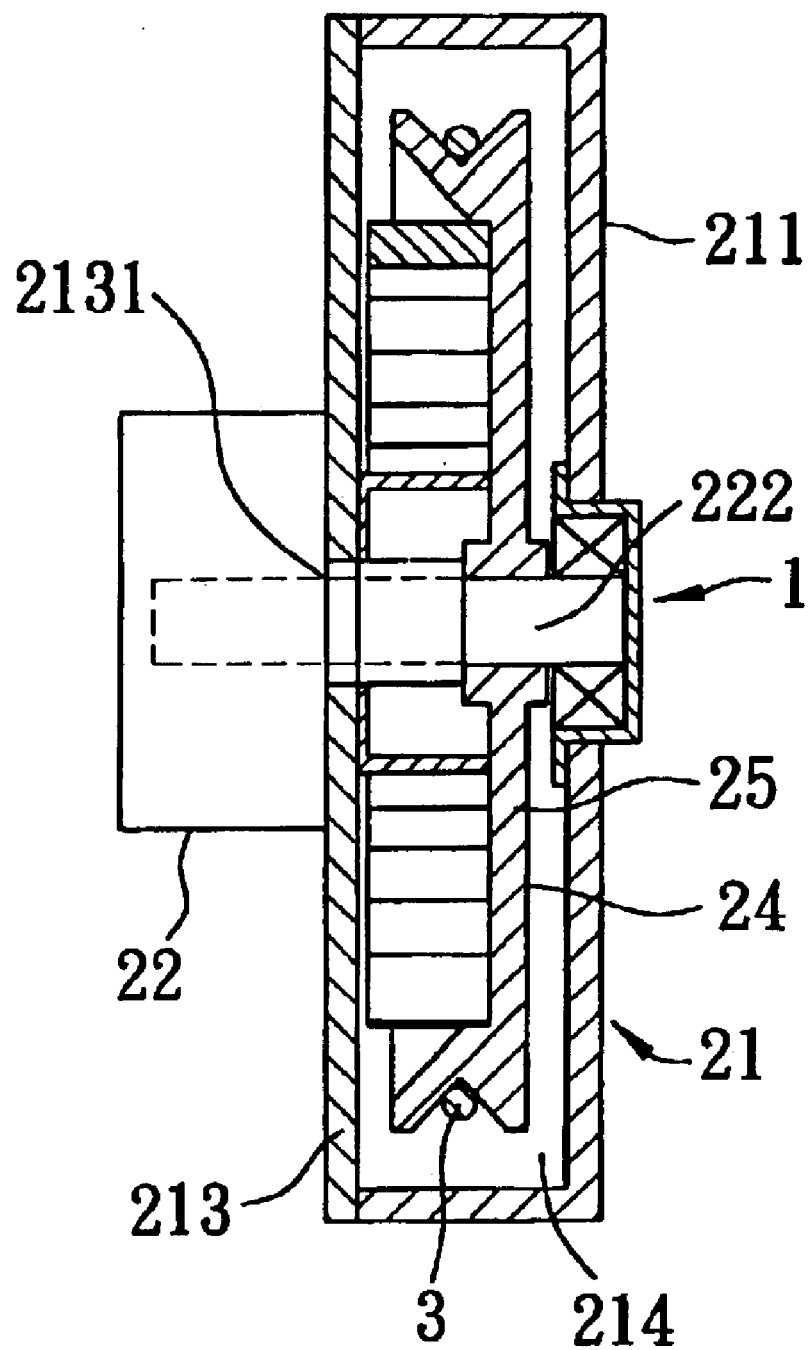
FIG. 18 is a schematic sectional view of the sensor assembly of the eighth preferred embodiment.

The eighth preferred embodiment of a direction adjustable device 1 for an automobile having a steering linkage is shown in FIGS. 17 and 18 to be substantially similar to the sixth preferred embodiment. Only in this embodiment, the dimension of the sensor assembly 2 is reduced. The force transmitting member 24 includes a reel 25 disposed in the receiving chamber 214 of the housing 21. The first cable 3 is similarly wound around the reel 25 of the force transmitting member 24. The cover plate 213 of the housing 21 is formed with a hole 2131, and is parallel to the top plate 211. The sensor assembly 2 includes a rotary control switch 22 installed on the cover plate 213, and includes a sensor rod 222 that extends through the hole 2131 in the cover plate 213 and into the receiving chamber 214. The reel 25 is sleeved fixedly around the sensor rod 222. The reversing member 6 is a torsional spring which is connected to the cover plate 213 and the reel 25. Because of the function of the reversing member 6, the reel 25 can be biased to turn in a second rotational direction. The rotary control switch 22 is directly mounted on the reel 25 so as to rotate synchronously with the reel 25 and so as to reduce the volume of the housing 21 so that the direction adjustable device 1 can be mounted more conveniently in an automobile.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A direction adjustable device adapted to be installed in an automobile having an automobile body, a set of automobile wheels mounted on the automobile body, a steering wheel, and a steering linkage interconnecting the steering wheel and the automobile wheels, said direction adjustable device comprising:

a turnable unit;

a motor drive unit adapted to be mounted to the to automobile body and coupled to said turnable unit for driving said turnable unit to turn; and a sensor assembly including a housing adapted to be mounted to the automobile body adjacent to the steering linkage, a force transmitting member mounted pivotally to said housing, a first cable having a first end connected to said force transmitting member, and a second end adapted to be connected to the steering linkage such that movement of the steering linkage in a first lateral direction results in pivoting movement of said force transmitting member from an initial position in a first rotational direction, a rotary control switch mounted to said housing and coupled to said force transmitting member such that pivoting movement of said force transmitting member is transmitted to said rotary control switch to enable said rotary control switch to generate a corresponding electrical output, a signal processing unit connected electrically to said motor drive unit and said rotary control switch, said signal processing unit receiving the electrical output of said rotary control switch, determining direction and extent of pivoting movement of said force transmitting member from the electrical output, and controlling said motor drive unit to drive said turnable unit to turn by an angle corresponding to the direction and extent of pivoting movement of said force transmitting member, and a reversing member coupled to said force transmitting member and adapted to be connected to the steering linkage such that movement of the steering linkage in a second lateral direction, which is opposite to said first lateral direction, results in pivoting movement of said force transmitting member from the initial position in a second rotational direction, which is opposite to said first rotational direction.

2. The direction adjustable device as claimed in claim 1, wherein said reversing member includes a torsional spring, which is coupled to said housing and said force transmitting member so as to bias said force transmitting member to turn in said second rotational direction.

3. The direction adjustable device as claimed in claim 1, wherein said reversing member includes a second cable having a first end connected to said force transmitting member and a second end adapted to be connected to the steering linkage such that movement of the steering linkage in a second lateral direction results in the pivoting movement of said force transmitting member in the second rotational direction.

4. The direction adjustable device as claimed in claim 1, wherein said rotary control switch includes a rotary sensor, a sensor rod operably associated with said rotary sensor, and a driven gear mounted on said sensor rod.

5. The direction adjustable device as claimed in claim 4, wherein said force transmitting member includes a driving gear mounted pivotally in said housing and meshing with said driven gear, and a reel connected coaxially and fixedly to said driving gear, said first cable being wound around said reel.

6. The direction adjustable device as claimed in claim 4, wherein said force transmitting member includes a driving gear mounted pivotally in said housing and meshing with said driven gear, said sensor assembly further including a rack that is disposed movably in said housing and that meshes with said driving gear, said first end of said first cable being fastened to an end of said rack.

7. The direction adjustable device as claimed in claim 4, wherein said force transmitting member includes a fixed-length rod with first and second ends, a driving gear mounted on said first end of said fixed-length rod and meshing with said driven gear, and a cable seat mounted on said second end of said fixed-length rod and connected to said first end of said first cable.

8. The direction adjustable device as claimed in claim 4, wherein said force transmitting member includes a telescopic rod with first and second ends, a driving gear mounted on said first end of said telescopic rod and meshing with said driven gear, and a cable seat mounted on said second end of said telescopic rod and connected to said first end of said first cable.

9. The direction adjustable device as claimed in claim 1, wherein said housing includes a top plate, a surrounding plate extending downwardly from a periphery of said top plate, and a cover plate disposed on bottom of said surrounding plate, said top, surrounding and cover plates cooperatively defining a receiving chamber, said force transmitting member being disposed in said receiving chamber, said driving gear being mounted rotatably in said receiving chamber.

10. The direction adjustable device as claimed in claim 9, wherein said top plate is formed with a longitudinal guide slot, and said cable seat is formed with a guide stud that projects into said guide slot to guide pivoting movement of said force transmitting member in said housing.

11. The direction adjustable device as claimed in claim 9, wherein said cover plate is formed with a hole, said driving gear having a fixed bottom post portion that extends through said hole in said cover plate, said reversing member including a torsional spring that is sleeved on said bottom post portion of said driving gear and that is connected to said housing, said housing further including a hollow cylinder, which covers said bottom post portion of said driving gear and which has a closed bottom end and an open top end that is fixed on said cover plate.

12. The direction adjustable device as claimed in claim 1, wherein said motor drive unit includes an outer casing, a motor unit disposed in said outer casing and connected electrically to said signal processing unit, and a first sector gear coupled to said motor unit.

13. The direction adjustable device as claimed in claim 12, wherein said turnable unit includes a base frame mounted pivotally in said outer casing, and a second sector gear mounted on said base frame and meshing with said first sector gear.

14. The direction adjustable device as claimed in claim 1, wherein said turnable unit is a lamp.

15. The direction adjustable device as claimed in claim 1, wherein said turnable unit is a camera.

16. The direction adjustable device as claimed in claim 1, wherein said housing includes a top plate, a surrounding plate extending downwardly from a periphery of said top plate, and a cover plate that is disposed fixedly on a bottom of said surrounding plate and that is parallel to said top plate, said top, surrounding and cover plates cooperatively defining a receiving chamber, said force transmitting member including a reel disposed in said receiving chamber, said first cable being wound around said reel, said rotary control switch being installed on said cover plate, and including a sensor rod that extends through said cover plate and into said receiving chamber and that rotates synchronously with said reel.

* * * * *